(12) United States Patent
Doo (10) Patent No.: US 8,911,898 B2
(45) Date of Patent: Dec. 16, 2014

(54) RECHARGEABLE BATTERY INCLUDING A ROTATION RESTRICTING PORTION

(75) Inventor: Jae-Gyun Doo, Suwon-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 626 days.

(21) Appl. No.: 12/911,401

(22) Filed: Oct. 25, 2010

(65) Prior Publication Data

US 2011/0129708 A1      Jun. 2, 2011

(30) Foreign Application Priority Data

Nov. 30, 2009   (KR) .................. 10-2009-0117082

(51) Int. Cl.
| | | |
|---|---|---|
| H01M 2/00 | (2006.01) | |
| H01M 2/02 | (2006.01) | |
| H01M 10/04 | (2006.01) | |
| H01M 2/04 | (2006.01) | |

(52) U.S. Cl.
CPC ............ *H01M 2/0413* (2013.01); *H01M 2/022* (2013.01); *H01M 10/04* (2013.01); *Y02E 60/12* (2013.01)
USPC ............ 429/163; 429/185; 429/175; 429/174

(58) Field of Classification Search
USPC ......... 429/163, 164, 171, 174, 175, 178, 181, 429/185, 94
See application file for complete search history.

(56) References Cited

U.S. PATENT DOCUMENTS

| | | | | |
|---|---|---|---|---|
| 7,318,980 | B2 * | 1/2008 | Kim ............................. | 429/211 |
| 7,442,467 | B2 * | 10/2008 | Ebi et al. ...................... | 429/174 |
| 7,601,455 | B2 | 10/2009 | Yoon | |
| 2008/0152997 | A1 | 6/2008 | Lee | |
| 2009/0085518 | A1 * | 4/2009 | Hong et al. .................. | 320/134 |
| 2009/0233160 | A1 * | 9/2009 | Kim .............................. | 429/94 |
| 2011/0091765 | A1 * | 4/2011 | Kim ............................ | 429/175 |
| 2011/0269013 | A1 * | 11/2011 | Yoon et al. .................... | 429/176 |

FOREIGN PATENT DOCUMENTS

| | | |
|---|---|---|
| JP | 2006-093151 | 4/2006 |
| JP | 2009-099424 | 5/2009 |
| KR | 10-2003-0066243 | 8/2003 |
| KR | 20-0427198 Y1 | 9/2006 |
| KR | 10-2006-0112743 | 11/2006 |
| KR | 20-0435038 Y1 | 1/2007 |
| KR | 10-2007-0097152 A | 10/2007 |

OTHER PUBLICATIONS

Registration Determination Certificate issued by KIPO on Nov. 29, 2011, corresponding to Korean Application No. 10-2009-0117082 and Request for Entry attached herewith.

* cited by examiner

*Primary Examiner* — Raymond Alejandro
(74) *Attorney, Agent, or Firm* — Robert E. Bushnell, Esq.

(57) ABSTRACT

A rechargeable battery includes an electrode assembly in which a separator is arranged between a positive electrode and a negative electrode, an electrolyte disposed in the electrode assembly, a can accommodating the electrode assembly and the electrolyte, an upper insulation plate disposed on an upper portion of the electrode assembly to contact the upper portion of the electrode assembly, a cap assembly coupled to the upper portion of the can, and a gasket arranged to form a seal between the cap assembly and the upper portion of the can and contacting an upper surface of the upper insulation plate. A rotation restricting portion to restrict rotation of the upper insulation plate with respect to the gasket is formed at least at a lower surface of the gasket and the rotation restricting portion includes a plurality of uneven portions which face the upper insulation plate.

17 Claims, 7 Drawing Sheets

RECHARGEABLE BATTERY INCLUDING A ROTATION RESTRICTING PORTION

CLAIM OF PRIORITY

This application makes reference to, incorporates the same herein, and claims all benefits accruing under 35 U.S.C. §119 from an application earlier filed in the Korean Intellectual Property Office on 30 Nov. 2009 and there duly assigned Serial No. 10-2009-0117082.

BACKGROUND OF THE INVENTION

1. Field of the Invention

One or more embodiments of the present invention relate to a rechargeable battery, and more particularly, to a rechargeable battery having a wound type electrode assembly.

2. Description of the Related Art

Rechargeable batteries are capable of being charged and discharged. In accordance with the type of a material forming electrolyte, the rechargeable batteries include lithium (Li) based batteries such as lithium ion (Li-ion) batteries and lithium polymer (Li polymer) batteries, alkali based batteries such as nickel cadmium (NiCd) batteries, nickel hydride (NiH) batteries, and nickel zinc (NiZn) batteries, and acid based batteries such as lead-acid batteries. The rechargeable battery is used for a variety of products from portable electronic information apparatus such as mobile phones, laptop computers, and electronic dictionaries, to electric equipments such as electric bicycles, electric scooters, and electric drills.

SUMMARY OF THE INVENTION

One or more embodiments of the present invention include a rechargeable battery that restricts rotational movement of an electrode current collector that may be generated in a battery to prevent detachment of an electrode tab so that reliability of the battery may be improved.

Additional aspects will be set forth in part in the description which follows and, in part, will be apparent from the description, or may be learned by practice of the presented embodiments.

In accordance with one or more embodiments of the present invention, a rechargeable battery includes an electrode assembly in which a separator is arranged between a positive electrode and a negative electrode, an electrolyte disposed in the electrode assembly, a can accommodating the electrode assembly and the electrolyte, an upper insulation plate disposed on an upper portion of the electrode assembly to contact the upper portion of the electrode assembly, a cap assembly coupled to the upper portion of the can, and a gasket arranged to form a seal between the cap assembly and the upper portion of the can and to contact an upper surface of the upper insulation plate. A rotation restriction portion to restrict rotation of the upper insulation plate with respect to the gasket is formed at anyone of the upper surface of the upper insulation plate and a lower surface of the gasket contacting each other. Thus, even when an external force such as a rotational vibration, or a couple, is applied to the battery, the resulting rotational movement of the electrode assembly inside the can may be limited and restricted so that the electrical continuity of the electric connection at the electrode tab will be maintained and guaranteed.

The rotation restriction portion may be formed on the lower surface of the gasket and the rotation restriction portion may be a plurality of uneven portions. Each protruding portion of the plurality of uneven portions may have the same width along the height of the protruding portion. Each protruding portion of the plurality of uneven portions may have a width that increases as a function of the distance from an upper portion of the protruding portion toward a lower portion of the protruding portion. Thus, since a catch of the protruding portion restricts the rotation of the upper insulation plate and the rotational movement of the electrode assembly, the electrical connection of the electrode tab will be assured and continuously maintained, free of a break or interruption. In particular, because the catch is sharp, rotation of the upper insulation plate may be further prevented.

A plurality of holes may be formed in the upper insulation plate and a catch on the protruding portion may be caught by the plurality of holes. Thus, since the rotation of the upper insulation plate and the rotational movement of the electrode assembly are restricted, the electric connection of the electrode tab will be guaranteed.

At least one concave portion may be formed on the upper surface of the upper insulation plate, and the concave portion may be configured to allow protruding portions of the plurality of uneven portions of the gasket to be caught by the concave portion of the upper insulation plate. Thus, since the rotation of the upper insulation plate and the rotational movement of the electrode assembly are restricted, the electrical connection of the electrode tab will be guaranteed.

A scratch portion may be formed on the upper surface of the upper insulation plate at a position corresponding to the plurality of uneven portions of the gasket. Thus, since the catch of the protruding portion restricts the rotation of the upper insulation plate and the rotational movement of the electrode assembly, the electric connection of the electrode tab may be guaranteed.

A plurality of fine protrusions may be formed on the surface portion of the upper insulation plate at a location corresponding to the uneven portions of the gasket. Thus, since the protrusions increase the frictional force between the lower surface of the gasket and the upper insulation plate, the rotation of the upper insulation plate and the rotational movement of the electrode assembly are restricted so that the electrical connection of the electrode tab will be maintained and electrical continuity at the electrode assembly will be guaranteed.

The can may have a cylindrical shape.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description.

The Lithium (element Li) based rechargeable battery includes a cylindrical type, a rectangular type, and a polymer type. The cylindrical type and rectangular type Lithium (element Li) based rechargeable batteries include an electrode assembly in which two different electrodes and a separator arranged between the two electrodes are stacked and wound, a can accommodating the electrode assembly, and a cap assembly assembled to the upper portion of the can. An active material is coated on a current collector that is a metal foil in each electrode plate of the electrode assembly. An electrode tab is drawn from a non-coated portion, (i.e., an uninsulated, or bare portion) of the current collector that is not coated with the active material.

One electrode tab drawn from the electrode assembly is electrically welded to the cap assembly. Another electrode tab is electrically welded to either the bottom surface of the can or to the cap assembly. When the electrode assembly vibrates within the can due to the application of an external force or an external vibration to the electrode assembly; however, the electrode tab drawn and welded to other fixed member may be detached from the fixed member so that performance of a battery may deteriorate and reliability may be reduced.

Figure 1:
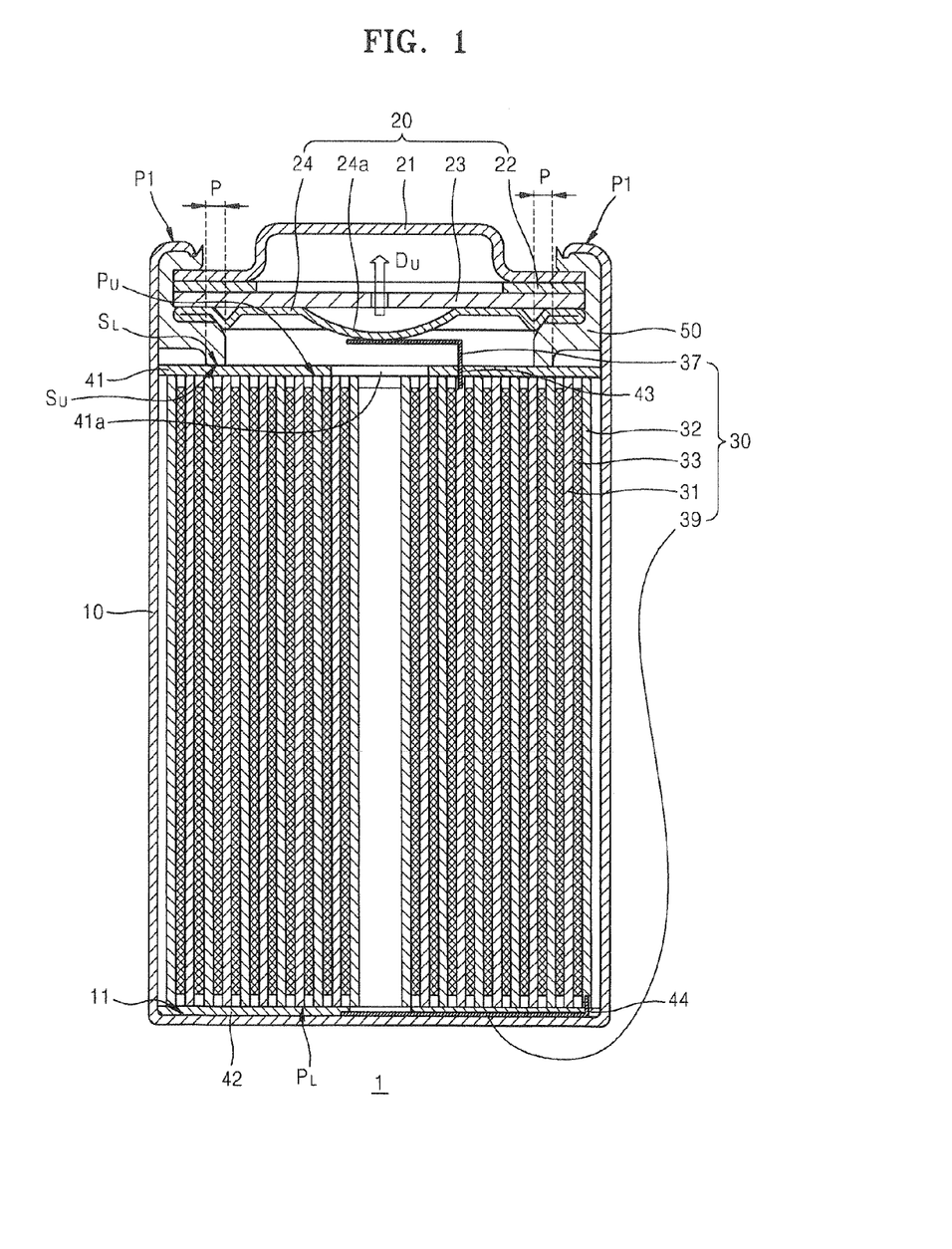
FIG. 1 is a cross-sectional view of a rechargeable battery constructed as of the principles of embodiment of the present invention.

FIG. 1 is a cross-sectional view of a rechargeable battery constructed as an embodiment of the present invention. Referring to FIG. 1, the rechargeable battery constructed as the present embodiment includes an electrode assembly 30, an electrolyte (not shown), a can 10, an upper insulation plate 41, a lower insulation plate 42, a cap assembly 20, and a gasket 50.

The electrode assembly 30 includes a positive electrode 31 in which a positive electrode active material is coated on a positive electrode current collector (not shown), a negative electrode 32 in which a negative electrode active material is coated on a negative electrode current collector (not shown), and a separator 33 performing an electrical insulation between the positive electrode 31 and the negative electrode 32. The electrode assembly 30 is manufactured by forming the positive electrode 31 and the negative electrode 32 in large plates, inserting the separator 33 between the positive electrode 31 and the negative electrode 32, and winding the combination of the positive electrode 31, the separator 33, and the negative electrode 32 to form a circular shape. The wound type electrode assembly 30 is referred to as a jelly roll.

The positive electrode 31 is manufactured by coating positive electrode active material slurry on a positive electrode current collector made of aluminium (Al) metal foil or metal mesh. The negative electrode 32 is manufactured by coating a negative electrode active material slurry on a negative electrode current collector that is formed of copper (Cu) metal foil or metal mesh.

The positive electrode active material may be Lithium Cobalt Oxide ($LiCoO_2$), and the negative electrode active material may be graphite or hard carbon.

The positive electrode active material has a structure to which lithium (Li) ions can be inserted into or extracted from layers. During charging, the lithium ions are extracted from the positive electrode 31 and the lithium ions are inserted into the negative electrode 32. During discharging, the lithium ions are extracted from the negative electrode 32 and inserted into the positive electrode 31.

The negative electrode active material has a structure in which the lithium ions can be inserted into or extracted from layers. During charging, the lithium ions are moved back to the negative electrode active material. During discharging, the lithium ions are emitted from the negative electrode active material.

The separator 33 is a porous insulation layer which allows the lithium ions to pass and electrically insulate the positive electrode 31 from the negative electrode 32. The separator 33 is made of polyethylene (PE) or polypropylene (PP).

A portion of the positive electrode current collector that is not coated with the active material is a positive electrode non-coated portion (not shown). A portion of the negative electrode current collector that is not coated with the active material is a negative electrode non-coated portion (not shown). A positive electrode tab 37 is electrically connected to the positive electrode non-coated portion. A negative electrode tab 39 is electrically connected to the negative electrode non-coated portion.

In an embodiment, the positive electrode non-coated portion may be formed at each of both end portions of the positive electrode current collector in a direction in which the positive electrode current collector is wound. The negative electrode non-coated portion may be formed at each of both end portions of the negative electrode current collector in a direction in which the negative electrode current collector extends. In this case, the positive electrode tab 37 may be drawn from the inner end portion of the wound electrode assembly 30. The negative electrode tab 39 may be drawn from the outer end portion of the wound electrode assembly 30.

In another embodiment, while the negative electrode non-coated portion may be formed at each of both end portions of the negative electrode current collector in a direction in which the negative electrode current collector extends, the positive electrode non-coated portion may be formed at each of both end portions and a middle portion of the positive electrode current collector in a direction in which the positive electrode current collector extends. In this case, the positive electrode tab 37 may be drawn from the middle portion of the wound electrode assembly 30. The negative electrode tab 39 may be drawn from the inner and outer end portions of the wound electrode assembly 30.

In the above two embodiments, regarding the direction in which the electrode tab is drawn, the positive electrode tab 37 may be drawn from the upper portion $P_U$ of the electrode assembly 30 and the negative electrode tab 39 may be drawn from the lower portion $P_L$ of the electrode assembly 30. Alternatively, both of the positive electrode tab 37 and the negative electrode tab 39 may be drawn from the upper portion $P_U$ of the electrode assembly 30.

In another embodiment, the positive electrode non-coated portion may be formed on the positive electrode current collector at a position corresponding to the upper portion $P_U$ of the electrode assembly 30 that is wound. The negative electrode non-coated portion may be formed on the negative electrode current collector at a position corresponding to the lower portion $P_L$ of the electrode assembly 30 that is wound. In this case, the positive electrode tabs 37 are upwardly drawn from a plurality of positive electrode non-coated portions and the negative electrode tabs 39 are downwardly drawn from a plurality of negative electrode non-coated portions, and such configuration may be suitable for a large capacity rechargeable battery.

The electrolyte is an intermediate medium that enables movement of ions between the positive electrode 31 and the negative electrode 32 and the electrolyte may be in a form of liquid, gel, or solid. While liquid electrolyte is used for Li-ion rechargeable batteries, gelled electrolyte is used for Li-polymer rechargeable batteries.

The can 10 may have a cylindrical shape and may be formed of a conductive metal material such as Al or an Al alloy. An upper insulation plate 41 and a lower insulation plate 42 are respectively arranged in the upper and lower sides of the electrode assembly 30 in the can 10. The upper insulation plate 41 electrically insulates the upper portion $P_U$ of the electrode assembly 30 from the cap assembly 20. A center pin (not shown) may be arranged in an empty space at the center of the electrode assembly 30 to prevent the unwinding of the electrode assembly 30 and provide an exhausting path for a gas generated inside of the battery. A center hole 41a is disposed at the center of the upper insulation plate 41 and corresponds to the empty space at the center of the electrode assembly 30. The center hole 41a may penetrate the upper insulation plate.

The cap assembly 20 includes, sequentially from the bottom, a safety vent 24, a current interrupt device 23, a positive temperature coefficient (PTC) 22, and a cap up 21. A protrusion 24a downwardly protrudes at the center of the safety vent 24. The protrusion 24a may protrude toward the electrode assembly 30. The protrusion 24a may be electrically connected to the positive electrode tab 37, for example, by welding. The safety vent 24 may be deformed upward in direction $D_U$ due to the pressure of a gas generated during short-circuit, thereby preventing electrical connection to the positive electrode tab 37. Also, the safety vent 24 deformed upward due to short-circuit destroys the current interrupt device 23 arranged above the safety vent 24, thereby cutting off the flow of current. When a temperature increases beyond a predetermined level, the resistance of the PTC 22 increases as well, thereby preventing the current exceeding a threshold current level that the battery may properly hold. As described above, the safety vent 24, the current interrupt device 23, and the PTC 22 may perform as safety devices. The present invention is however not limited thereto and some of the above safety devices may not be provided. The cap up 21 having an electrode terminal that is bulged upward to be electrically connected to the outside is arranged above the PTC 22.

The gasket 50 is arranged between the cap assembly 20 and the upper portion of the can 10. The gasket 50 seals and electrically insulates the cap assembly 20 from the can 10. The can 10 is encapsulated by a clamping work to press the portions P1 of the can 10 encompassing the gasket 50 inwardly and downwardly.

In the embodiment of FIG. 1, the positive electrode tab 37 drawn upward by penetrating the upper insulation plate 41 via a hole 43 is coupled to a positive electrode circuit portion, for example, the safety vent 24, of the cap assembly 20. The negative electrode tab 39 downwardly drawn by penetrating the lower insulation plate 42 via a hole 44 is coupled to the lower surface of the can 10. The hole 43 may penetrate the upper insulation plate 41, and the hole 44 may penetrate the lower insulation plate 42. Due to the above structure, when the electrode assembly 30 moves or rotates inside the can 10, the electric connection of the electrode tabs 37 and 39 may be deteriorated or the electrode tabs 37 and 39 may be disadvantageously detached from the components to which they are connected. This phenomenon may be easily generated when the rechargeable battery is applied for products such as electric drills, to which vibrations may be periodically applied. Thus, the rechargeable batteries applicable to the products pass a rotation and vibration test. The structure to prevent the rotational movement of the electrode assembly 30 inside a battery is described below.

The lower surface $S_L$ of the gasket 50 is configured to contact the upper insulation plate 41. When the gasket 50 presses the electrode assembly 30 downwardly by the clamping work, the electrode assembly 30 is compressed and thus fixed between the lower surface 11 of the can 10 and the gasket 50. Since the gasket 50 and the upper insulation plate 41 are formed of a material such as polypropylene (PP), a frictional force between the gasket 50 and the upper insulation plate 41 is not large. Accordingly, when an external vibration is large, the electrode assembly 30 may rotate inside the can 10.

Conversely, according to the present invention, since a rotation restriction portion is provided on the lower surface $S_L$ of the gasket 50 or the upper surface $S_U$ of the upper insulation plate 41, the rotation of the upper insulation plate 41 with respect to the gasket 50 that is fixed may be restricted so that the rotational movement of the electrode assembly 30 may be advantageously restricted.

Figure 2:
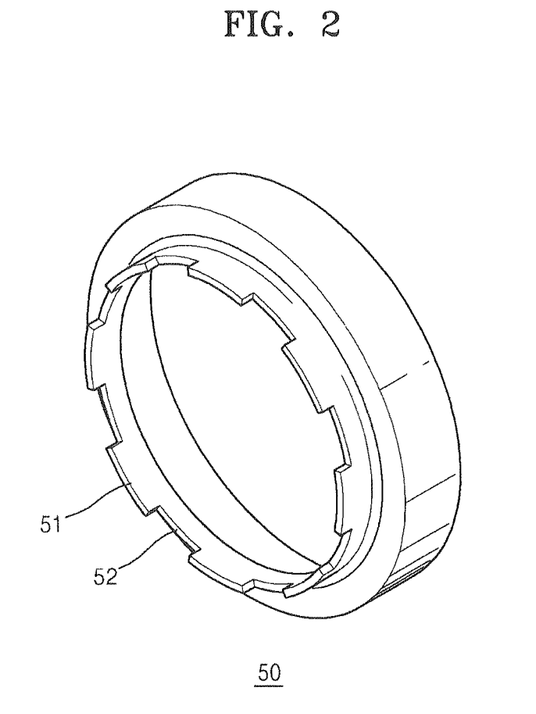
FIG. 2 is a oblique view illustrating the bottom surface of the gasket of FIG. 1.
Figure 3:
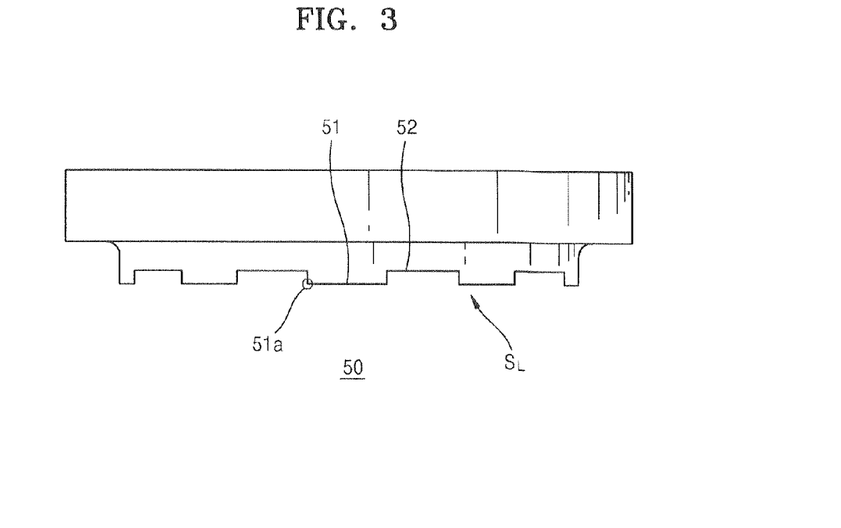
FIG. 3 is a side view of the gasket of FIG. 1.

In an embodiment as illustrated in FIGS. 2 and 3, the rotation restriction portion may be the gasket 50 having a plurality of uneven portions 51 and 52 formed on the lower surface $S_L$ of the gasket 50. A protruding portion 51 and a recessed portion 52 are alternately formed in the uneven portion. Assuming that a force downwardly pressing the gasket 50 is the same, since pressure is inversely proportional to an area receiving the force, the pressure applied to the upper insulation plate 41 through the protruding portion 51 is increased compared to the situation where the external force is applied to the upper insulation plate 41 through an even lower surface of the gasket 50. Since the upper insulation plate 41 is made of a material having a low rigidity, the protruding portion 51 partially intrudes into the upper insulation plate 41. Then, a catch 51a of the protruding portion 51 may restrict the rotation of the upper insulation plate 41. The plurality of uneven portions 51 and 52 may respective refer to distinct convex portions and concave portions.

Figure 4:
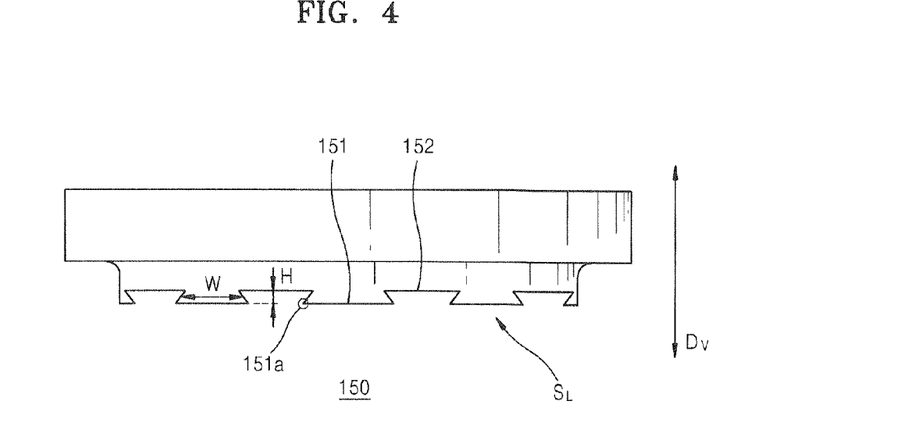
FIG. 4 is a side view of a gasket constructed as another embodiment of the present invention.

Another embodiment of the rotation restriction portion may be a gasket 150 as illustrated in FIG. 4. The gasket 150 includes uneven portions 151 and 152 which have different widths along the height H in a vertical direction $D_V$. For example, the width W of the protruding portion 151 is larger at the lower portion thereof than the upper portion thereof. In the present embodiment, since a catch 151a of the protruding portion 151 is sharp so that the rotation of the upper insulation plate 41 and the electrode assembly 30 may be further restricted. In one embodiment, the width W of the protruding portion 151 increases in the vertical direction $D_V$ along which the protruding portion 151 protrudes toward the upper insulation plate 41. The uneven portions 151 and 152 may be formed in a shape of dovetail.

Figure 5:
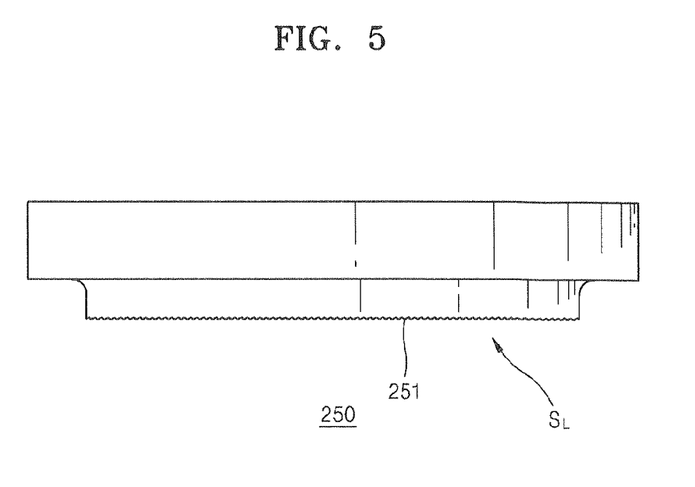
FIG. 5 is a side view of a gasket constructed as another embodiment of the present invention.

Another embodiment of the rotation restriction portion may be a gasket 250 as illustrated in FIG. 5. A rotation restriction portion, on which a plurality of fine uneven portions 251 are formed, is formed on the lower surface $S_L$ of the gasket 250. The fine uneven portions 251 may restrict the rotation of the upper insulation plate 41 by increasing a frictional force between the gasket 250 and the upper insulation plate 41. In one embodiment, the fine uneven portions 251 may refer to the roughness of the lower surface $S_L$ of the gasket 250. In this one embodiment, in comparison with uneven portions 51 and 52 as shown in FIG. 3, the fine uneven portions 251 may have no distinct and clean convex portions and concave portions, and may refer to a flat lower surface $S_L$ with a predetermined surface roughness.

Figure 6:
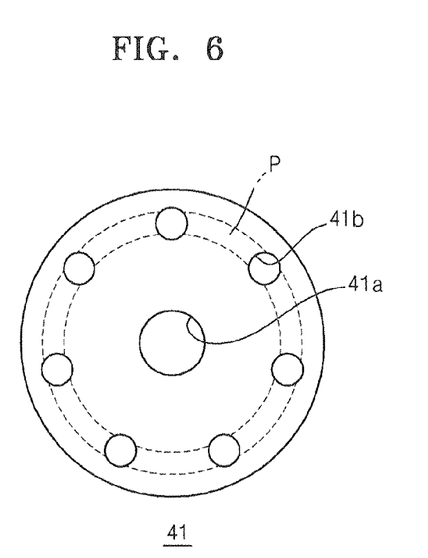
FIG. 6 is a plan view of an insulation plate constructed as an embodiment of the present invention.

FIG. 6 is a plan view of the upper insulation plate 41 constructed as an embodiment of the present invention. Referring to FIG. 6, a plurality of holes 41b are formed in the upper insulation plate 41. The holes 41b facilitate injection of an electrolyte solution into the can 10 that accommodates the electrode assembly 30 and provides a path through which gas generated inside may be exhausted. The holes 41b may be formed at positions corresponding to a path P contacting the lower surface $S_L$ of the gasket 50, 150, or 250. Accordingly, the catches 51a and 151a on the lower surfaces of the gaskets 50, 150, and 250 may more firmly and easily fix the upper insulation plate 41 so that an effect of restricting the rotational movement of the upper insulation plate 41 may be improved. The number and size of the holes 41b in the upper insulation plate 41 are not limited to those of the above-described embodiments and may vary in a variety of ways. The holes 41b may penetrate the upper insulation plate 41.

Figure 7A:
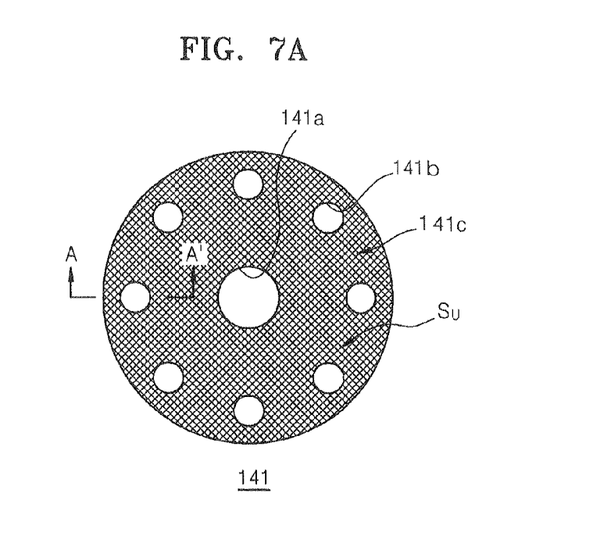
FIG. 7A is a plan view of an insulation plate constructed as another embodiment of the present invention.

FIG. 7A is a plan view of an upper insulation plate 141 constructed as another embodiment of the present invention. Referring to FIG. 7A, a plurality of scratches 141c are obliquely formed on the upper surface $S_U$ of the upper insulation plate 141. In particular, the scratches 141c are formed on the upper surface $S_U$ at a position corresponding to a portion contacted by the lower surface $S_L$ of the gasket 150. A center hole 141a is disposed at the center of the upper insulation plate 141 and corresponds to the empty space at the center of the electrode assembly 30. The center hole 141a may penetrate the upper insulation plate 141.

Figure 7B:
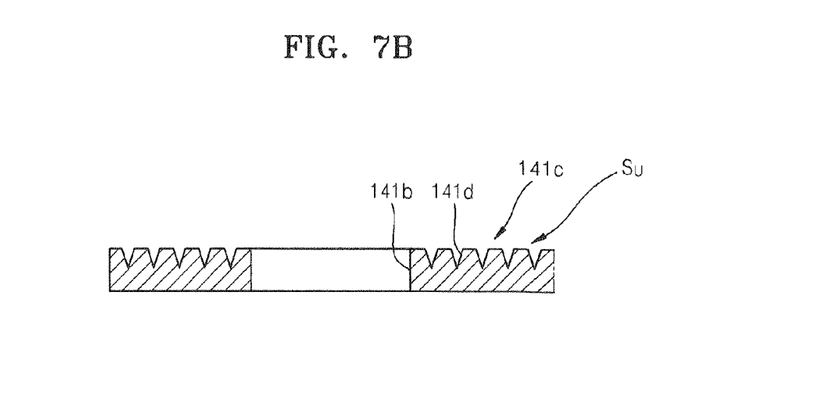
FIG. 7B is a cross-sectional view taken along sectional line A-A' of FIG. 7A.

FIG. 7B is a cross-sectional view taken along line A-A' of FIG. 7A. Referring to FIG. 7B, the scratches 141c form a plurality of notch portions 141d. Accordingly, as the catches 51a and 151a on the lower surfaces $S_L$ of the gaskets 50, 150, and 250 are caught in the notch portions 141d, the rotation of the upper insulation plate 141 may be further restricted. The number and size of holes 141b in the upper insulation plate 141 are not limited to those of the above-described embodiments and may vary in a variety of ways. The position, size, and number of the area where the scratches 141c are formed are not limited to the above embodiment and may vary in a variety of ways. The holes 141b may penetrate the upper insulation plate 141.

Figure 8A:
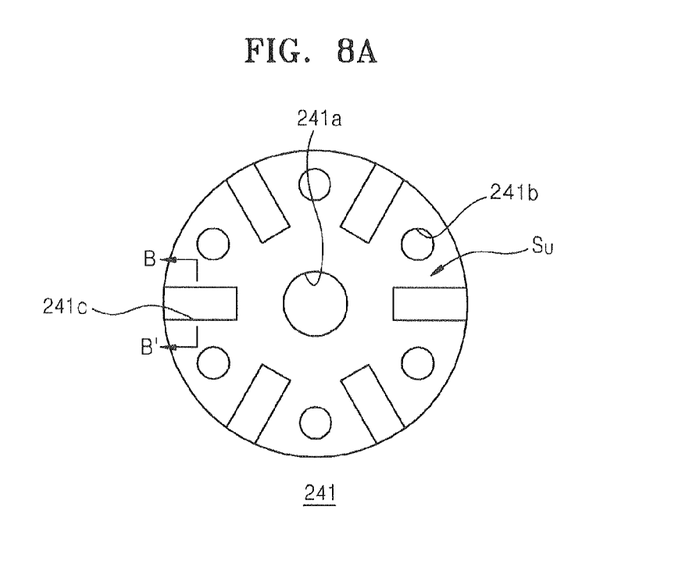
FIG. 8A is a plan view of an insulation plate constructed as another embodiment of the present invention.
Figure 8B:
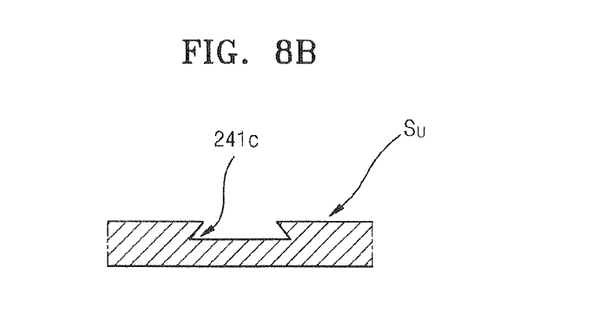
FIG. 8B is a cross-sectional view taken along sectional line B-B' of FIG. 8A.

FIG. 8A is a plan view of an insulation plate 241 constructed as another embodiment of the present invention. FIG. 8B is a cross-sectional view taken along line B-B' of FIG. 8A. Referring to FIGS. 8A and 8B, a concave portion 241c is formed between a plurality of holes 241b in the upper surface $S_U$ of the upper insulation plate 241. In one embodiment, one concave portion 241c may be formed between two neighboring holes 241b. The shape of the concave portion 241c may substantially correspond to that of the protruding portion 151 of the gasket 150 of FIG. 4. Thus, the catch 151a of the gasket 150 is caught more easily by the upper insulation plate 241, so that the rotation of the upper insulation plate 241 may be further restricted. The position, size, and number of the concave portion 241c are not limited to the above embodiment and may vary in a variety of ways. A center hole 241a is disposed at the center of the upper insulation plate 241 and corresponds to the empty space at the center of the electrode assembly 30. The center hole 241a may penetrate the upper insulation plate 241.

Figure 9:
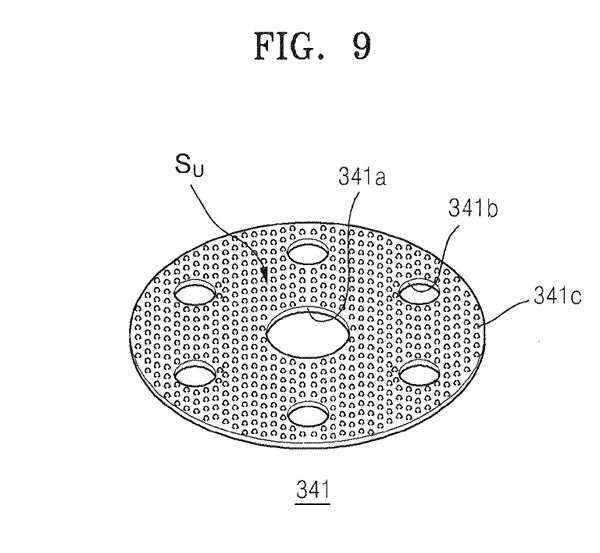
FIG. 9 is a oblique view of an insulation plate constructed as another embodiment of the present invention.

FIG. 9 is a perspective view of an insulation plate 341 constructed as another embodiment of the present invention. Referring to FIG. 9, a plurality of fine protrusions 341c are formed on the upper surface $S_U$ of the upper insulation plate 341. In one embodiment, the fine protrusions 341c may refer to the roughness of the upper surface $S_U$ of the upper insulation plate 341, and the upper surface $S_U$ of the insulation plate 341 may have a flat surface with a predetermined surface roughness. The protrusions 341c may increase the frictional force between the upper insulation plate 41 and the lower surface $S_L$ of the gasket 50. The protrusions 341c may be configured to catch the catches 51a and 151a on the lower surfaces of the gaskets 50, 150, and 250. According to the above structure, the rotational movement of the upper insulation plate 341 may be further restricted. The number and size of the holes 341b of the upper insulation plate 341 are not limited to the above embodiment and may vary in a variety of ways. Also, the shape, position, and number of the protrusion 341c of the upper insulation plate 341 are not limited to the above embodiment and may vary in a variety of ways. A center hole 341a is disposed at the center of the upper insulation plate 341 and corresponds to the empty space at the center of the electrode assembly 30. The holes 341a and 341b may penetrate the upper insulation plate 341.

It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:

1. A rechargeable battery, comprising:
an electrode assembly in which a separator is arranged between a positive electrode and a negative electrode;
an electrolyte disposed in the electrode assembly;
a can accommodating the electrode assembly and the electrolyte;
an upper insulation plate disposed on an upper portion of the electrode assembly, the upper insulation plate being in contact with the upper portion of the electrode assembly;
a cap assembly physically coupled to an upper portion of the can;
a gasket formed separately from the upper insulation plate and the gasket comprising a first portion and a second portion protruding from the first portion towards the upper insulation plate, the first portion of the gasket arranged between the cap assembly and the upper portion of the can to form a seal between the cap assembly and the upper portion of the can, a lower surface of the second portion of the gasket being in physical contact with an upper surface of the upper insulation plate; and
a rotation restricting portion disposed to restrict rotation of the upper insulation plate relative to the gasket and formed at least at the lower surface of the second portion of the gasket, the rotation restricting portion comprising a plurality of uneven portions which face the upper insulation plate.

2. The rechargeable battery of claim 1, wherein each of the plurality of uneven portions comprises a protruding portion, and the protruding portion has a constant width along a height of the protruding portion.

3. The rechargeable battery of claim 1, wherein each of the plurality of uneven portions comprises a protruding portion, and the protruding portion has a width that increases from an upper portion of the protruding portion toward a lower portion of the protruding portion.

4. The rechargeable battery of claim 3, wherein a plurality of holes are formed in the upper insulation plate and a catch of the protruding portion is caught by the plurality of holes.

5. The rechargeable battery of claim 1, wherein at least one concave portion is formed on the upper surface of the upper insulation plate, and the concave portion is configured to allow protruding portions of the plurality of uneven portions of the gasket to be caught by the concave portion of the upper insulation plate.

6. The rechargeable battery of claim 1, wherein a scratch portion is formed on the upper surface of the upper insulation plate at a position corresponding to the plurality of uneven portions of the gasket.

7. The rechargeable battery of claim 1, wherein a plurality of protrusions are formed on the upper surface of the upper insulation plate at a position corresponding to the plurality of uneven portions of the gasket.

8. The rechargeable battery of claim 1, wherein the can has a cylindrical shape.

9. A rechargeable battery, comprising:
an electrode assembly comprising a positive electrode, a negative electrode and a separator interposed between the positive and negative electrodes;
an electrolyte disposed in the electrode assembly;
a can accommodating the electrode assembly and the electrolyte;
an upper insulation plate connecting to an upper portion of the electrode assembly;
a cap assembly coupled to an upper portion of the can; and
a gasket formed separately from the upper insulation plate and the gasket comprising a first portion and a second portion protruding from the first portion towards the upper insulation plate, the gasket arranged between the cap assembly and the upper portion of the can, a first surface of the second portion of the gasket being in immediate contact with a second surface of the upper insulation plate, with at least the first surface comprising at least one of a protrusion and a recess which face the upper insulation plate.

10. The rechargeable battery of claim 9, wherein the first surface of the gasket comprises a plurality of first protrusions and a plurality of recesses.

11. The rechargeable battery of claim 10, wherein each of the plurality of first protrusions has a same width along a height of the each of the plurality of first protrusions.

12. The rechargeable battery of claim 10, wherein each of the plurality of first protrusions has a width gradually increasing in a direction along which the each of the plurality of first protrusions protrudes toward the upper insulation plate.

13. The rechargeable battery of claim 12, wherein a plurality of holes are formed in the upper insulation plate and catches of the plurality of first protrusions are caught by the plurality of holes.

14. The rechargeable battery of claim 10, wherein at least one concave is formed on the second surface of the upper insulation plate, and the concave is configured to allow the plurality of first protrusions of the gasket to be caught by the concave of the upper insulation plate.

15. The rechargeable battery of claim 10, wherein a scratch portion is formed on the second surface of the upper insulation plate at a position corresponding to the plurality of first protrusions and recesses of the gasket.

16. The rechargeable battery of claim 10, wherein a plurality of second protrusions are formed on the second surface of the upper insulation plate at a position corresponding to the plurality of the first protrusions and recesses of the gasket.

17. The rechargeable battery of claim 9, wherein the can has a cylindrical shape.

* * * * *